United States Patent
Oota et al.

(10) Patent No.: US 9,624,649 B2
(45) Date of Patent: Apr. 18, 2017

(54) WHEEL TYPE WORKING VEHICLE

(71) Applicant: Hitachi Construction Machinery Co., Ltd., Bunkyo-ku, Tokyo (JP)

(72) Inventors: Makoto Oota, Kasumigaura (JP); Hiroshi Tsukui, Abiko (JP); Yuuichi Todokoro, Abiko (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 113 days.

(21) Appl. No.: 14/436,511

(22) PCT Filed: Oct. 9, 2013

(86) PCT No.: PCT/JP2013/077486
§ 371 (c)(1),
(2) Date: Apr. 17, 2015

(87) PCT Pub. No.: WO2014/061528
PCT Pub. Date: Apr. 24, 2014

(65) Prior Publication Data
US 2015/0240457 A1    Aug. 27, 2015

(30) Foreign Application Priority Data
Oct. 19, 2012    (JP) .................................. 2012-231924

(51) Int. Cl.
*E02F 9/26* (2006.01)
*B60Q 1/30* (2006.01)
(Continued)

(52) U.S. Cl.
CPC .............. *E02F 9/26* (2013.01); *B60Q 1/2615* (2013.01); *B60Q 1/30* (2013.01); *E02F 3/301* (2013.01);
(Continued)

(58) Field of Classification Search
CPC . B60D 1/36; B60D 1/465; B60Q 1/26; B60Q 1/2615; B60Q 1/2619;
(Continued)

(56) References Cited

FOREIGN PATENT DOCUMENTS

| EP | 2 474 672 A1 | 7/2012 |
|---|---|---|
| JP | 6-10049 U | 2/1994 |

(Continued)

OTHER PUBLICATIONS

International Search Report (PCT/ISA1210) dated Dec. 24, 2013, with English translation (four (4) pages).

*Primary Examiner* — Michael McCullough
*Assistant Examiner* — Brendan Tighe
(74) *Attorney, Agent, or Firm* — Crowell & Moring LLP

(57) ABSTRACT

A lower traveling structure (2) having front wheels (16) and rear wheels (17) provided on a chassis (12) extending in a front and rear direction, an upper revolving structure (4) rotatably mounted on the chassis (12), and a working mechanism (11) provided on a front side of the upper revolving structure (4) and at an intermediate position in a left and right direction are provided. On the other hand, a towing through hole (14J, 14K) bored through an upper side position on both left and right sides and in a front and rear direction and used for mounting a cable in towing is provided on a front attachment mounting plate (14) provided on a front side position of the chassis (12) constituting the upper revolving structure (4). Moreover, a reflecting member (23, 24) located inside in the left and right direction of the lower traveling structure (2) from the position of the towing through hole (14J, 14K) and in the vicinity of the towing through hole (14J, 14K) and reflecting ambient light is provided on a rear surface (14B) of the attachment mounting plate (14).

4 Claims, 11 Drawing Sheets

(51) Int. Cl.
| | |
|---|---|
| *E02F 9/02* | (2006.01) |
| *E02F 9/24* | (2006.01) |
| *B60Q 1/26* | (2006.01) |
| *E02F 3/30* | (2006.01) |
| *E02F 9/00* | (2006.01) |
| *E02F 9/08* | (2006.01) |
| *E02F 3/32* | (2006.01) |

(52) U.S. Cl.
CPC ............... *E02F 3/32* (2013.01); *E02F 9/003* (2013.01); *E02F 9/02* (2013.01); *E02F 9/085* (2013.01); *E02F 9/0858* (2013.01); *E02F 9/24* (2013.01)

(58) Field of Classification Search
CPC ...... B60Q 1/2623; B60Q 1/2626; B60Q 1/28; B60Q 1/30; B60Q 1/302; B60Q 1/305; B60Q 1/32; B60R 1/003; B62D 49/0614; E02F 3/32; E02F 3/325; E02F 9/003; E02F 9/0858; E02F 9/26
USPC .......................................... 280/477; 414/687
See application file for complete search history.

(56) References Cited

FOREIGN PATENT DOCUMENTS

| | | |
|---|---|---|
| JP | 3088847 U | 10/2002 |
| JP | 2011-12512 A | 1/2011 |
| WO | WO 2011/027765 A1 | 3/2011 |

WHEEL TYPE WORKING VEHICLE

TECHNICAL FIELD

The present invention relates to a wheel type working vehicle on which left and right front wheels and left and right rear wheels are provided so that the vehicle can run on a general road.

BACKGROUND ART

In general, a wheel type hydraulic excavator as a typical example of the wheel type working vehicle is constituted by a lower traveling structure having a chassis extending in a front and rear direction, and having the left and right front wheels and the left and right rear wheels provided on the chassis so as to constitute a vehicle body, an upper revolving structure rotatably mounted on the chassis of the lower traveling structure and constituting the vehicle body, and a working mechanism provided on a front side of the upper revolving structure and at an intermediate position in a left and right direction.

On a front side position of the chassis in the lower-traveling structure, an attachment mounting plate made of a plate body extending in the left and right direction and a vertical direction is provided. On this attachment mounting plate, attachment for work including an outrigger device and an earth removing device (blade) can be mounted on a front surface thereof (Patent Document 1).

The wheel type hydraulic excavator can go to a work site by running on a public road by itself without being transported on a truck. After it arrives at the work site, in a state in which the vehicle body is made stable by pressing the outrigger device mounted on the chassis of the lower traveling structure, on the ground, an excavation work of earth and sand can be performed by using the working mechanism.

Here, since the wheel type hydraulic excavator running on a public road is handled as a general vehicle, it is necessary to take a vehicle body inspection similarly to a passenger car and a truck. In order to pass the vehicle body inspection, many security components such as a head lamp for running, a turn signal light, a reflecting member and the like, for example, need to be provided.

PRIOR ART DOCUMENT

Patent Document

Patent Document 1: Japanese Patent Laid-Open No. 2011-12512 A

SUMMARY OF THE INVENTION

Here, the reflecting member which is one of the security components has its mounting position finely specified so that presence and a size of a vehicle can be grasped even in a dark place. When the reflecting member is to be mounted on a rear side of the wheel type hydraulic excavator, it can be mounted easily by using a counterweight provided on the rear part of the upper revolving structure.

On the other hand, in case the reflecting member is to be mounted on a front side of the wheel type hydraulic excavator, the reflecting member is mounted on the head lamp and the like provided on the front side of the upper revolving structure. However, in the recent hydraulic excavator, a size of the upper revolving structure is reduced in order to realize a smaller revolving radius and enlargement of right front view field. Moreover, the working mechanism is provided on the front side of the wheel type hydraulic excavator, and this working mechanism is included in an entire length dimension of the vehicle. As a result, the upper revolving structure might deviate from a mounting range for mounting the reflecting member on the front side of the hydraulic excavator.

In this type of the wheel type hydraulic excavator, the reflecting member needs to be mounted on the front side of the chassis of the lower traveling structure. However, on the front side position of the chassis, a front wheel steered (rotated) to left and right and the outrigger device folded to an upper side in running are arranged. Thus, there are many obstacles on the front side position of the chassis when the reflecting member is to be visually recognized, and there is a problem that it is difficult to arrange the reflecting member at a position that can be visually recognized from a wide range.

In view of the above-discussed problems with the prior art, it is an object of the present invention to provide a wheel type working vehicle in which a range capable of being visually recognized is ensured wide and the reflecting member can be provided on the front side position of the chassis.

(1) A wheel type working vehicle according to the present invention includes a lower traveling structure having a chassis extending in a front and rear direction and left and right front wheels and left and right rear wheels provided on the chassis so as to constitute a vehicle body, an upper revolving structure rotatably mounted on the chassis of the lower traveling structure and constituting the vehicle body, and a working mechanism provided on a front side of the upper revolving structure and at an intermediate position in a left and right direction, comprising: an attachment mounting plate made of a plate body extending in the left and right direction and a vertical direction and on which an attachment is mounted on a front surface is provided on a front side position of the chassis; and a towing through hole bored through an upper side position on both left and right sides and in the front and rear direction and used for mounting a cable in towing is provided on the attachment mounting plate.

In order to solve the above-described problem, a characteristic of a configuration adopted by the present invention is that a reflecting member located inside in the left and right direction of the vehicle body from a position of the towing through hole and in the vicinity of the towing through hole and reflecting ambient light is provided on a rear surface of the attachment mounting plate.

With this arrangement, the reflecting member located inside in the left and right direction of the vehicle body from the position of the towing through hole and in the vicinity of the towing through hole and reflecting ambient light is provided on the rear surface of the attachment mounting plate. Therefore, the reflecting member can be mounted by using the attachment mounting plate provided for mounting the attachment. Furthermore, the reflecting member can be provided with a simple constitution on the rear surface of the attachment mounting plate formed flat without preparing a complicated bracket. As a result, the reflection member can have the wheel type working vehicle recognized by reflecting the ambient light even in a dark place.

Moreover, the reflecting member is juxtaposed with the vicinity of the towing through hole through which a cable including a wire is inserted when the wheel type working vehicle is towed. As a result, the reflective light by the reflecting member can be also visually recognized through the towing through hole from a front surface side of the attachment mounting plate on a side opposite to the reflecting member.

As a result, a range in which the reflecting member (reflective light) can be visually recognized can be expanded to the front side of the attachment mounting plate, and reliability and safety can be improved. Moreover, by using the attachment mounting plate formed flat as a mounting target, the reflecting member can be provided, on the attachment mounting plate with a simple constitution.

On the other hand, since the reflecting member is arranged inside in the left and right direction of the vehicle body from the position of the towing through hole, the reflecting member can be arranged at a position a little deeper from an outer peripheral portion of the chassis. As a result, the reflecting member can be protected from collision of a flying stone and adhesion of earth and sand.

Moreover, since the reflecting member is provided on the attachment mounting plate, the reflecting member does not interfere with a movable member including the working mechanism, the front wheel, and the attachment. Therefore, the movable member can be freely designed, and size reduction and improvement of operation performances can be realized.

(2) According to the present invention, the reflecting member is provided at a position that can be visually recognized from a diagonally front side through the towing through hole. As a result, a visible range of the reflecting member through the towing through hole can be enlarged to the front side.

(3) According to the present invention, the reflecting member is arranged by extending in the front and rear direction so as to be orthogonal to the attachment mounting plate. As a result, the reflecting member can reflect light emitted to the vehicle body from outside the vehicle body, and the vehicle can be visually recognized even in a dark place.

(4) According to the present invention, the reflecting member is constituted by a screw seat having a female screw hole provided inside in the left and right direction of the vehicle body from the position of the towing through hole and located in the vicinity of the towing through hole and on a rear surface of the attachment mounting plate, a mounting bracket mounted on the screw seat by a male screw member screwed with the female screw hole, and a reflecting body mounted on the mounting bracket so as to reflect light emitted toward, the vehicle body mainly from outside the vehicle body.

With this arrangement, by screwing the male screw member with the female screw hole of the screw seat, the mounting bracket can be mounted on the screw seat. By mounting the reflecting body on this mounting bracket, the reflecting member reflecting the light mainly from outside the vehicle body can be assembled. On the other hand, a direction of the reflecting body can be adjusted only by loosening the male screw member. Moreover, in case the reflecting body is damaged, the reflecting body can be replaced easily.

(5) According to the present invention, the reflecting body of the reflecting member is arranged with a reflecting surface thereof directed to the outside of the vehicle body. As a result, the reflecting body can reliably reflect the light from the outside of the vehicle body.

MODE FOR CARRYING OUT THE INVENTION

Hereinafter, an embodiment of a wheel type working vehicle according to the present invention will be described in detail by citing an example applied to a wheel type hydraulic excavator by referring to FIG. 1 to FIG. 11.

Figure 1:
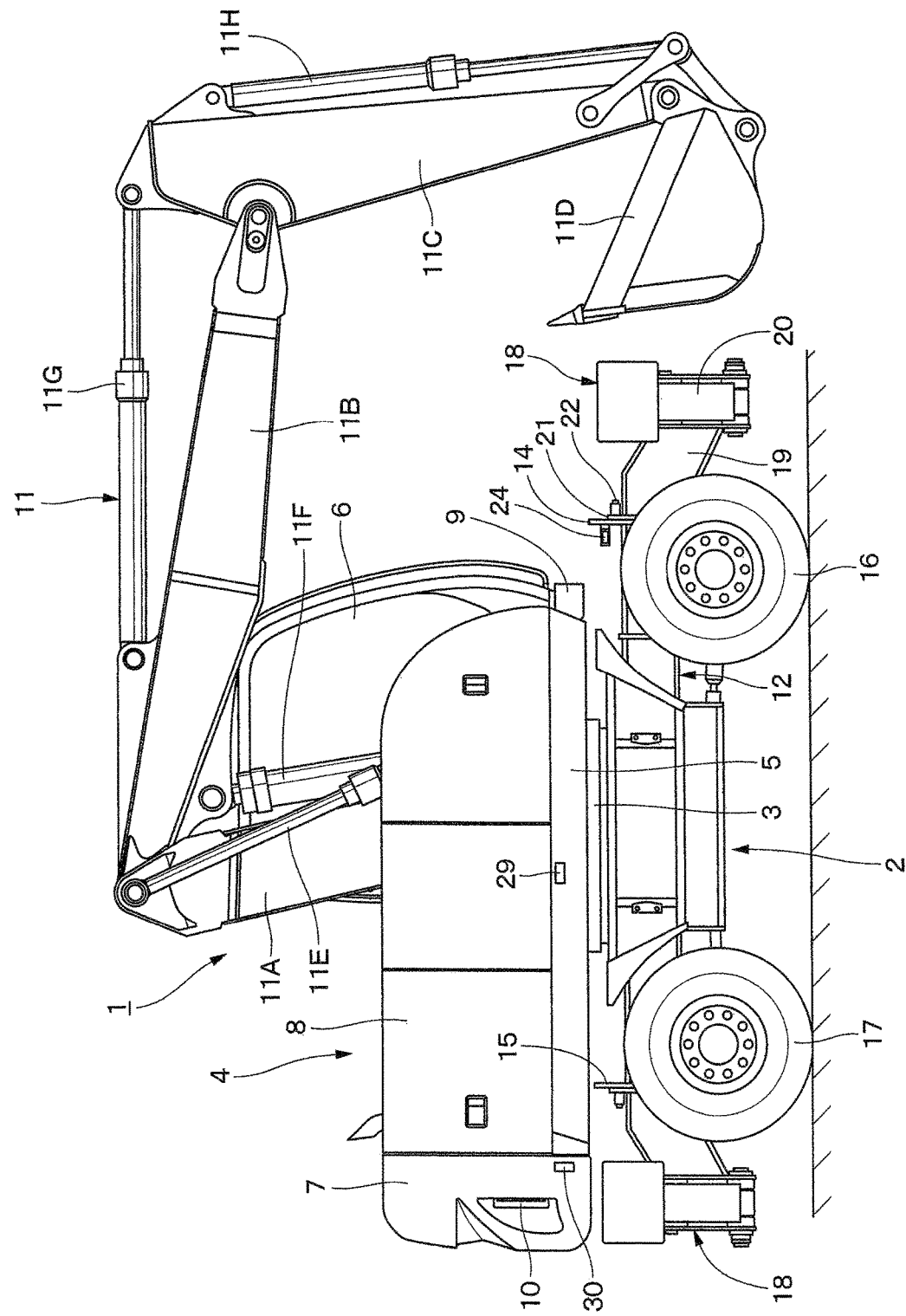
FIG. 1 is a right side view showing a wheel type hydraulic excavator according to the embodiment of the present invention.

In FIG. 1, designated at 1 is a wheel type hydraulic excavator as a typical example of a wheel type working vehicle. This wheel type hydraulic excavator 1 is constituted by a wheel type lower traveling structure 2 having a chassis 12 which will be described later, an upper revolving structure 4 rotatably mounted on the lower traveling structure 2 through a swing circle 3, a working mechanism 11 which will be described later, an outrigger device 18, and reflecting members 23 and 24, The lower traveling structure 2 and the upper revolving structure 4 constitute a vehicle body of the wheel type hydraulic excavator 1, and this wheel type hydraulic excavator 1 can move to a work site by running on a public road by itself by the wheel type lower traveling structure 2 and performs an excavation work of earth and sand at this work site by using the working mechanism 11.

As shown in FIG. 1 to FIG. 4, the upper revolving structure A is constituted by a revolving frame 5, rotatably mounted around the swing circle 3 as a revolving center on the chassis 12 which will be described later, a cab 6 provided on a front left side of the revolving frame 5, a counterweight 7 mounted on a rear part of the revolving frame 5 and taking a weight balance with the working mechanism 11, and a housing cover 8 located on a front side of the counterweight 7 and covering an engine and the like (not shown) mounted on the revolving frame 5.

Here, since the wheel type hydraulic excavator 1 running on a public road is handled as a general vehicle, it is necessary to take a vehicle body inspection similarly to a passenger car and a truck. In order to pass the vehicle body inspection, many security components are mounted on the wheel type hydraulic excavator 1. As the security components, a head lamp 9 which will be described later, a tail lamp device 10, reflecting members 23, 24, 29, 30, 31 are known.

The head lamp (headlight) 9 is provided on both left and right sides (only right side is shown), located on a front side of the upper revolving structure 4. This head lamp 9 is to illuminate a front during running and working. In the vicinity of the head lamp 9, a turn signal lamp (turn signal light) on the front side is provided (not shown) for indicating that the vehicle is to turn left or right during running to a vehicle coming from the front.

Figure 3:
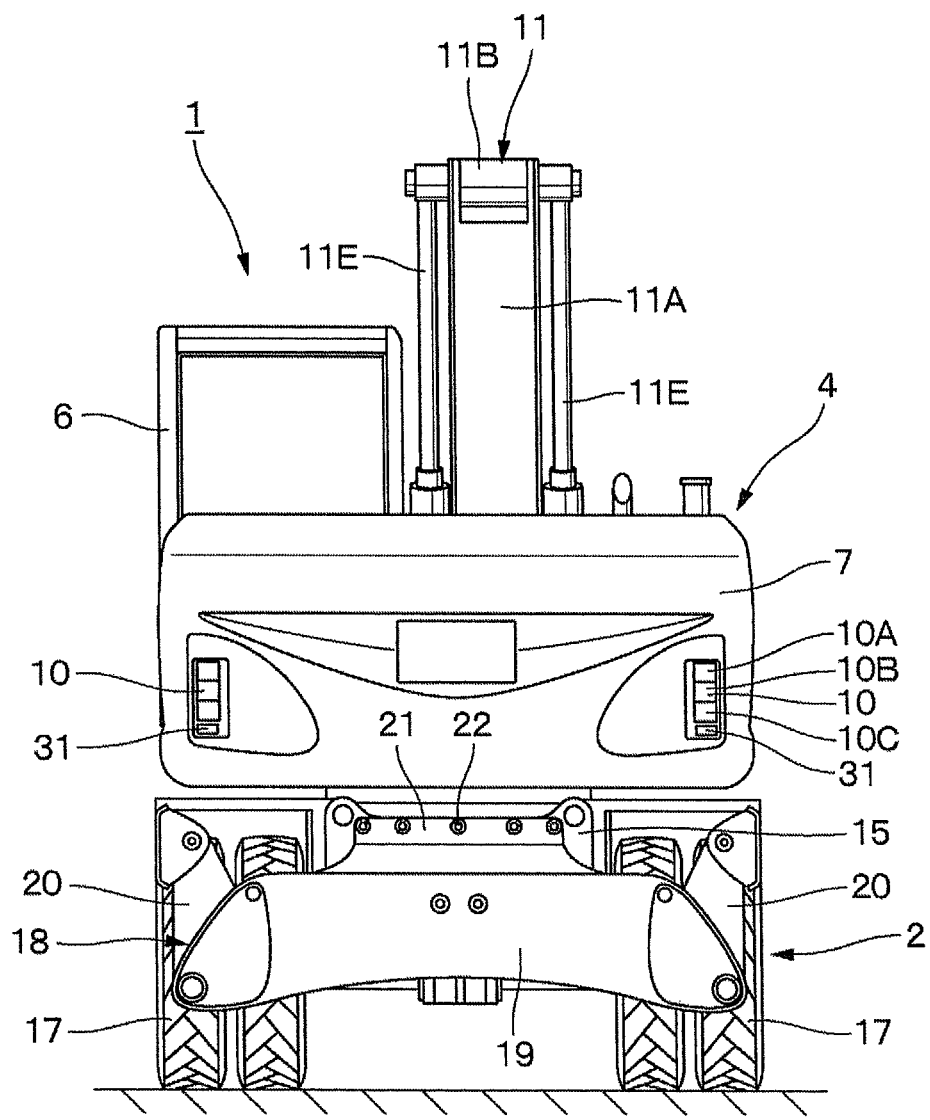
FIG. 3 is a rear view of the wheel type hydraulic excavator in FIG. 1 seen from a rear side.
Figure 4:
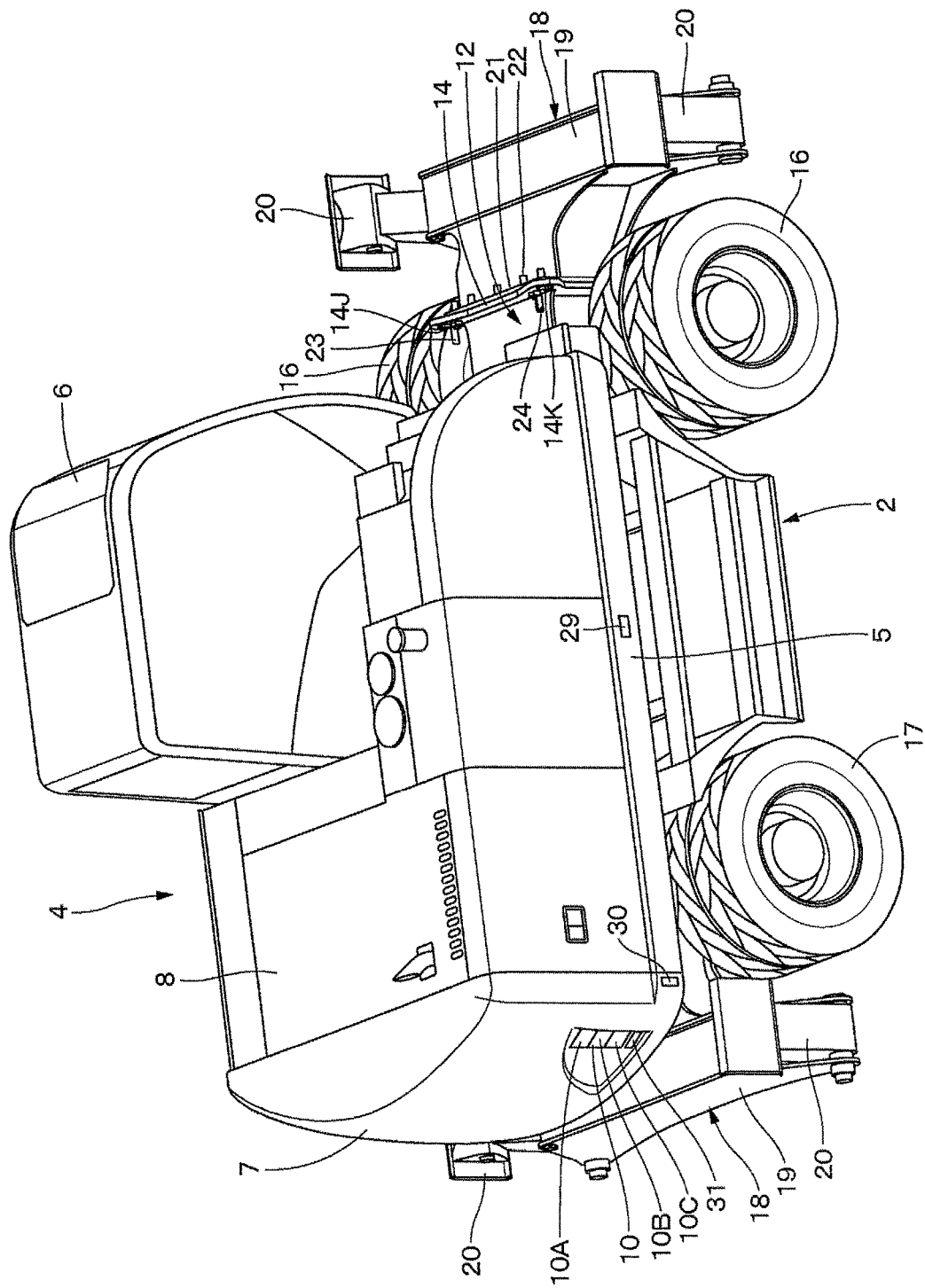
FIG. 4 is an enlarged perspective view showing the wheel type hydraulic excavator from which a working mechanism is omitted from diagonally rear right side.

On the other hand, as shown in FIG. 3, the left and right tail lamp devices 10 are provided on lower side positions on the both left and right sides of the counterweight 7. Each of the tail lamp devices 10 is constituted by a stop lamp (stop light) 10A, a back up lamp (back up light) 10B, and a turn signal lamp (turn signal light) 10C, for example.

In the cab 6, an operator's seat on which an operator is seated, a steering handle for steering left and right front wheels 16 which will be described later, and an control lever for operating the working mechanism 11 (none of them are shown) are provided.

Figure 2:
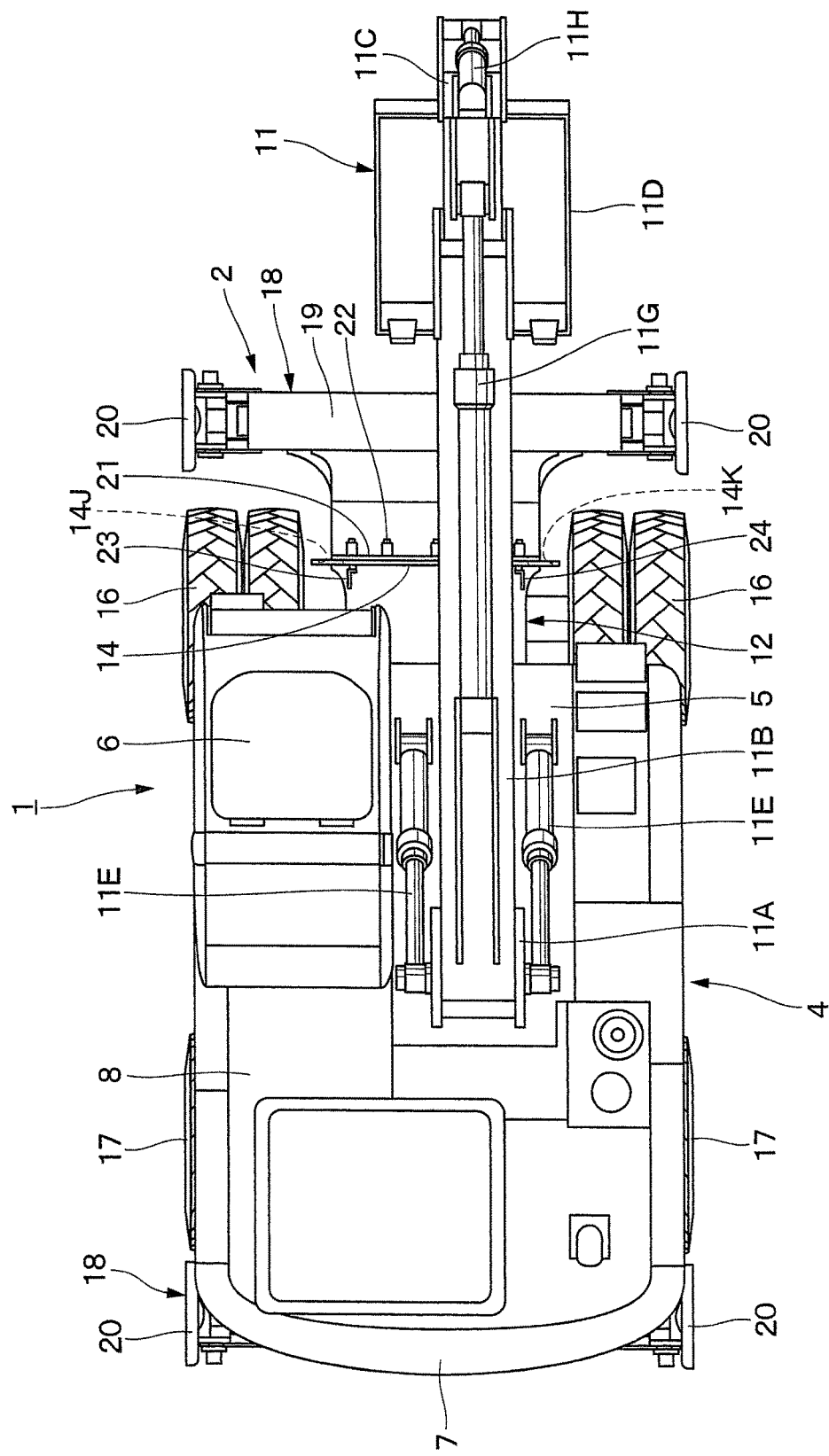
FIG. 2 is a plan view showing the wheel type hydraulic excavator in FIG. 1 seen from an upper side.

As shown in FIG. 2, the working mechanism 11 is provided on the front side of the upper revolving structure 4 and capable of moving upward/downward at an intermediate position in the left and right direction. As shown in FIG. 1, this working mechanism 11 is constituted by a lower boom 11A having a base end side mounted on a front part side of the revolving frame 5 at the intermediate position in the left and right direction rot at ably in the vertical direction, an upper boom 11B rotatably mounted, on a front end side of the lower boom 11A, an arm 11C rotatably mounted on the front end side of the upper boom 11B, a bucket 11D rotatably mounted on the front end side of the arm 11C, a boom cylinder 11E for moving them, a positioning cylinder 11F, an arm cylinder 11G, and a bucket cylinder 11H.

Next, a configuration including the chassis 12, the front wheel 16, a rear wheel 17 constituting the lower traveling structure 2 will be described.

Figure 5:
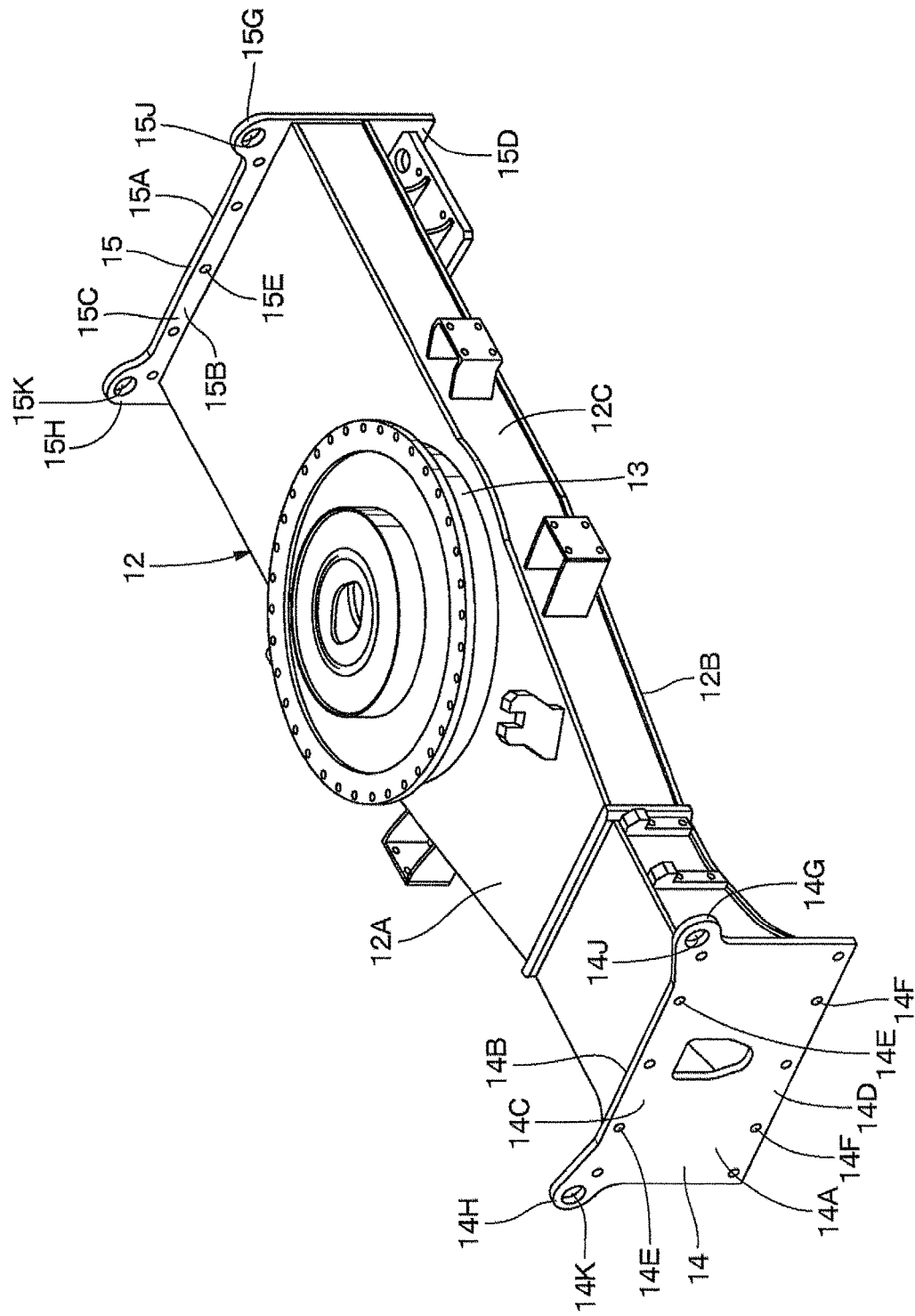
FIG. 5 is an enlarged perspective view showing a chassis as a single unit from diagonally front left side.
Figure 6:
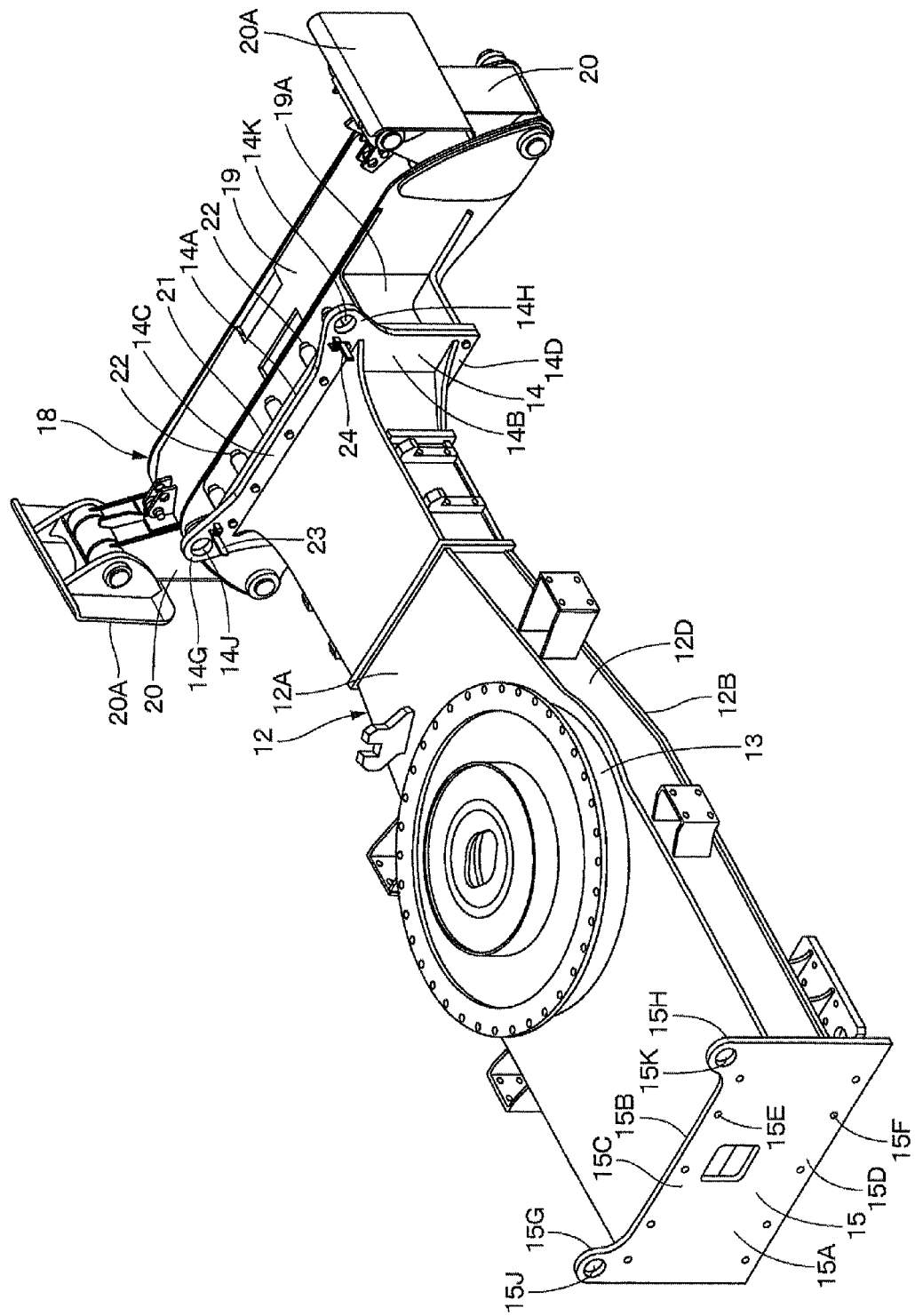
FIG. 6 is an enlarged perspective view showing a state in which an outrigger device and a reflecting member are mounted on the chassis in FIG. 5 from a diagonally rear right side.
Figure 7:
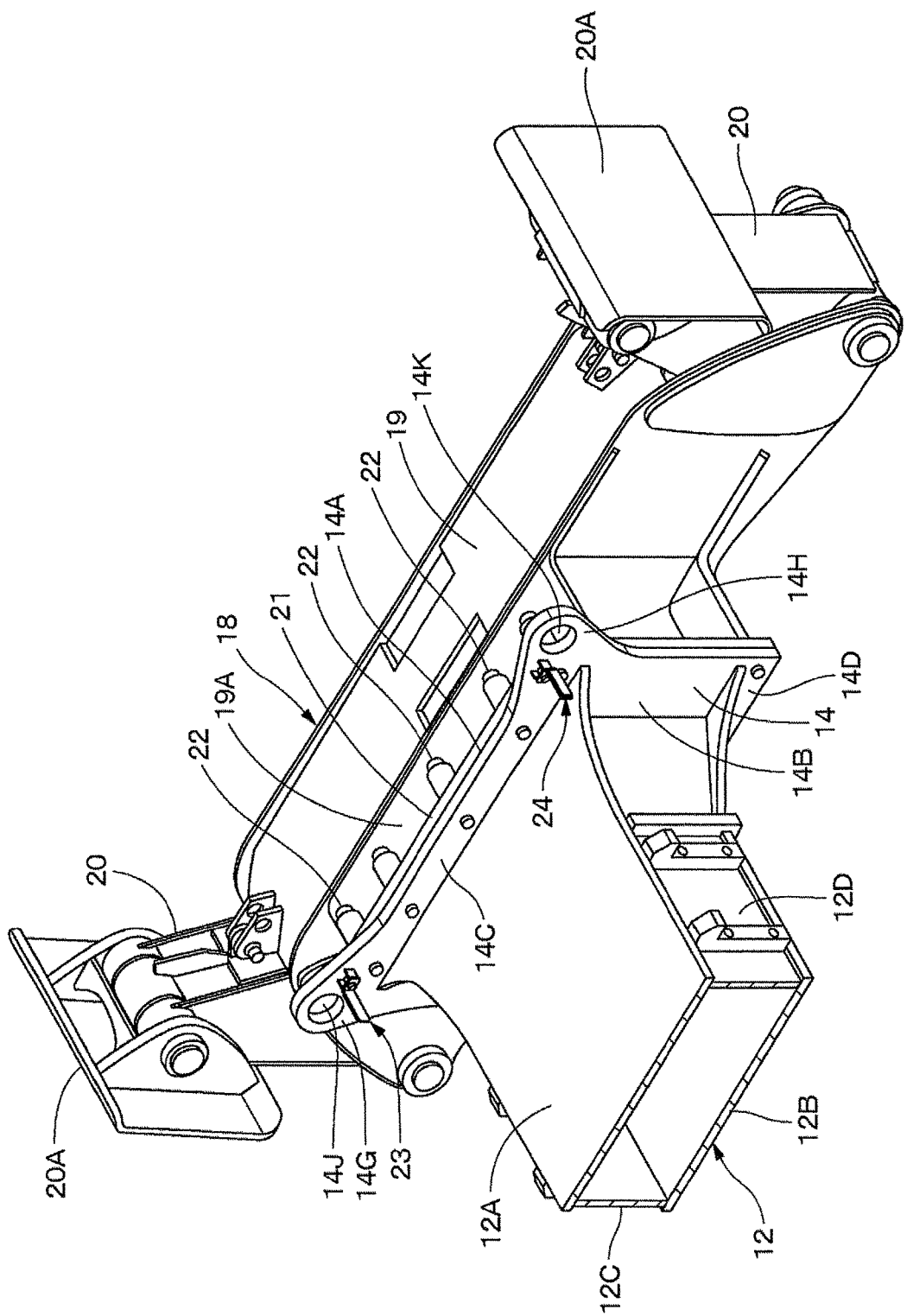
FIG. 7 is an enlarged perspective view of an essential part showing a front side portion of the chassis, the outrigger device, and the reflecting member in FIG. 6.

The chassis 12 is to be a base of the lower traveling structure 2. As shown in FIG. 5 to FIG. 7, the chassis 12 is formed as a box structural body having a square section surrounded by a flat upper surface plate 12A extending substantially in parallel in the front and rear direction, a lower surface plate 123 faced with the upper surface plate 12A in the vertical direction, and a left side surface plate 12C and a right side surface plate 12D arranged between the upper surface plate 12A and the lower surface plate 12B and faced with each other in the left and right direction. On the other hand, it is configured such that a cylindrical body 13 having a cylindrical shape is provided in an intermediate portion of the upper surface plate 12A in the front and rear direction, and the upper revolving structure 4 with the swing circle 3 as a revolving center is mounted on the cylindrical body 13. Moreover, the chassis 12 has a front attachment mounting plate 14 forming a front end surface and a rear attachment mounting plate 15 forming a rear end surface.

As shown in FIG. 5, the front attachment mounting plate 14 is provided as a front end surface at a front side position of the chassis 12, and this front attachment mounting plate 14 is formed as a rectangular flat plate body extending in the left and right direction and in the vertical direction by using a thick steel plate and the like. The front attachment mounting plate 14 is fixed to the front end portion of the chassis 12 by using means such as welding and the like. The outrigger device 18 which will be described later is mounted on its front surface 14A on the front attachment mounting plate 14, and the reflecting members 23 and 24 which will be described later are mounted on a rear surface 14B.

On the other hand, the front attachment mounting plate 14 is formed by extending to an upper side more than the upper surface plate 12A of the chassis 12 and by extending to a lower side more than the lower surface plate 12B. As a result, an upper side portion of the front attachment mounting plate 14 becomes an upper mounting portion 14C which is a mounting margin extending upward from the upper surface plate 12A. On the other hand, a lower side portion of the front attachment mounting plate 14 is a lower mounting portion 14D which is a mounting margin extending downward, from the lower surface plate 12B.

A plurality of female screw holes 14E are juxtaposed in the left and right direction on the upper mounting portion 14C of the front attachment mounting plate 14. Similarly, a plurality of female screw holes 14F are juxtaposed in the left and right direction on the lower mounting portion 14D. Each of these female screw holes 14E, 14F is to be screwed with a bolt 22 which will be described later for mounting the outrigger device 18 to the front attachment mounting plate 14.

Figure 8:
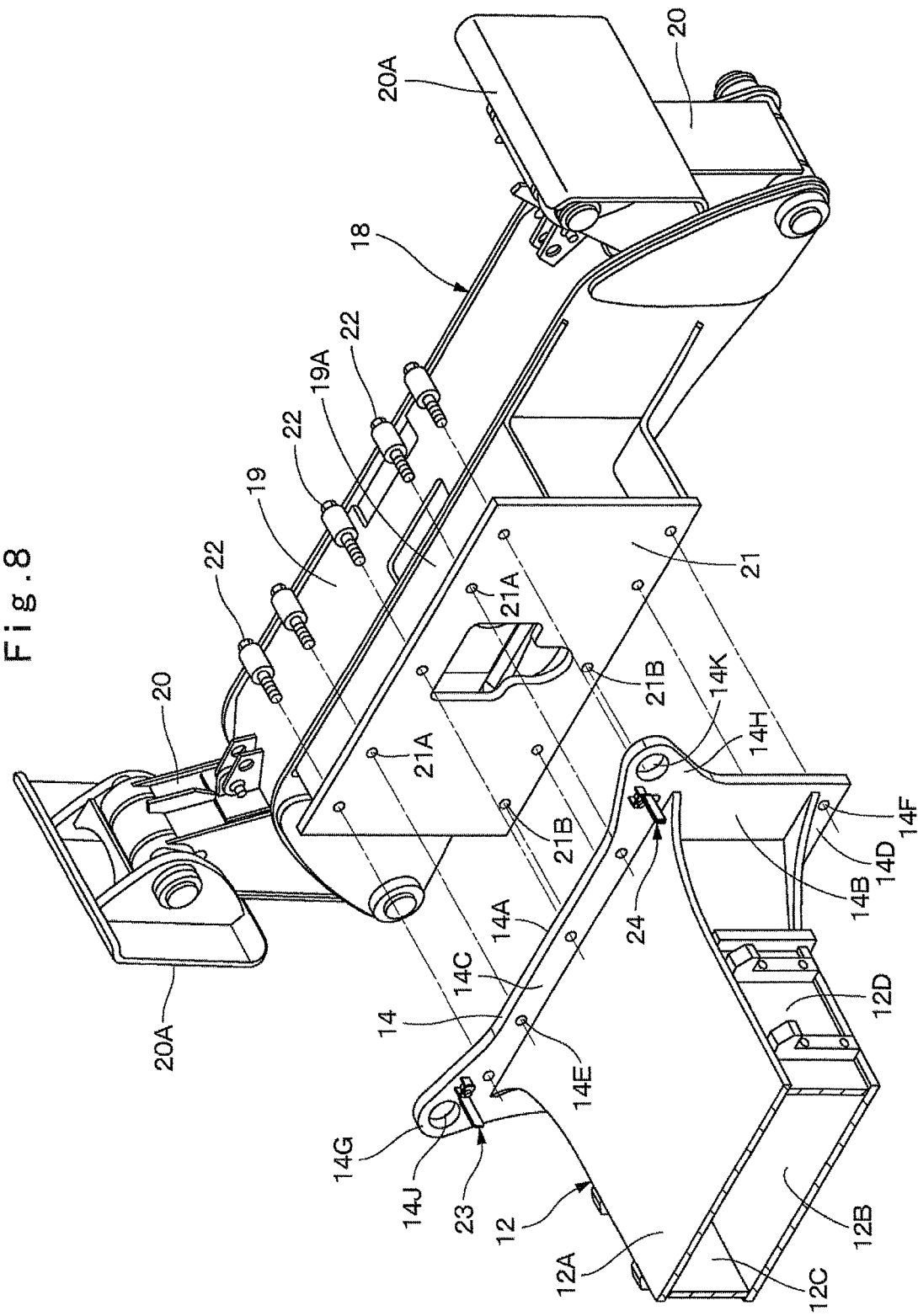
FIG. 8 is an exploded perspective view showing a state in which the outrigger device is removed from a front attachment mounting plate of the chassis.

Moreover, as shown in FIG. 7 and FIG. 8, tongue-piece shaped extended portions 14G, 14H located on an upper side on both left and right sides are provided on the front attachment mounting plate 14. These extended portions 14G, 14H are formed by extending to the upper side more than the upper mounting portion 14C, and towing through holes 14J, 14K are provided on a front end side thereof. The left and right towing through holes 14J, 14K are for a wire, a hook and the like to be inserted through when the wheel type hydraulic excavator 1 is towed.

In this case, the wheel type hydraulic excavator 1 has an extremely large weight, and a thick and robust wire or hook is used as a cable for towing it. Thus, the towing through holes 14J, 14K are formed as through holes each having a large diameter dimension so that the thick wire and a clamp can be inserted through. Here, the towing through holes 14J, 14K are arranged at positions higher than height positions of peripheral members such as the left and right front wheels 16 to be steered, a stored outrigger device 18 and the like, for example, so that the wire and the clamp hooked for towing do not interfere with them.

As shown in FIG. 6, the rear attachment mounting plate 15 is provided as a rear end surface, on a rear side position of the chassis 12, and this rear attachment mounting plate 15 is constituted substantially similarly to the above described front attachment mounting plate 14 except that the rear attachment mounting plate 15 is inverted in the front and rear direction. That is, the rear attachment mounting plate 15 has a rear surface 15A, a front surface 15B, an upper mounting portion 15C, a lower mounting portion 15D, female screw holes 15E, 15F, left and right extended portions 15G, 15H, and left and right towing through holes 150, 15K.

The left and right front wheels 16 are provided at a front end portion of a front axle (not shown) located on the front side of the chassis 12 and extending in the left and right direction, and the left and right front wheels 16 can be steered by rotating the steering wheel in the cab 6. On the other hand, left and right rear wheels 17 are provided on a front end portion of a rear axle (not shown) located on the rear side of the chassis 12 and extending in the left and right direction.

The front and rear outrigger devices 13 are mounted on both end sides of the chassis 12 in the front and rear direction, and each of the outrigger devices 18 is used as an attachment for work in this embodiment. Since the front and rear outrigger devices 18 have the similar configuration, only the outrigger device 18 on the front side will be described. The outrigger device 18 is to ensure stability of the vehicle body when the wheel type hydraulic excavator 1 performs an excavation work and the like by using the working mechanism 11.

As shown in FIG. 7, the outrigger device 18 is formed as a rectangular cylindrical body extending in the left and right direction and is constituted by an outrigger support frame 19 provided with a rectangular cylindrical mounting bracket 19A extending to the rear side in an intermediate portion in its length direction, left and right outriggers 20 having a base end side rotatably mounted on both end portions of the outrigger support frame 19 in the left and right direction and provided with a grounding plate 20A at a front end portion, left and right outrigger cylinders (none of them is shown) provided between the outrigger support frame 19 and left and right outriggers 20, respectively and rotating each of the outriggers 20 in the vertical direction, and a mounting end plate 21 fixed to the mounting bracket 19A of the outrigger support frame 19.

Here, the mounting end plate 21 is detachably mounted on the front attachment mounting plate 14 of the chassis 12. The mounting end plate 21 is formed as a rectangular flat plate body extending in the left and right direction and in the vertical direction by using a thick steel plate and the like. In this case, the mounting end plate 21 is set to have a vertical dimension so that the mounting end plate 21 is lower than each of the towing through holes 14J, 14K and so as not to close them when being mounted on the front attachment mounting plate 14 of the chassis 12.

On the other hand, as shown in FIG. 8, in the upper side portion and the lower side portion of the mounting end plate 21, a plurality of bolt insertion holes 21A and 21B are provided at positions corresponding to each of the female screw holes 14E, 14F of the front attachment mounting plate 14. The bolt 22 is inserted into each of the bolt insertion holes 21A, 21B and this bolt 22 is screwed with each of the female screw holes 14E, 14F of the front attachment mounting plate 14 respectively. As a result, as shown in FIG. 7, the mounting end plate 21 can be integrally mounted on the front attachment mounting plate 14.

In the outrigger device 18 configured as above, when the wheel type hydraulic excavator 1 is to run, for example, the outrigger 20 is stood up and stored by contracting the outrigger cylinder. On the other hand, when a work is to be performed by the working mechanism 11, the grounding plate 20A of the outrigger 20 is pressed onto the ground by extending the outrigger cylinder so as to be jacked up, and the vehicle body is made stable.

Next, a configuration of the reflecting members 23 and 24 which is a feature portion of the present invention provided on the front side of the chassis 12 will be described in accordance with FIG. 3 to FIG. 11.

Designated at 23 is the left, side reflecting member provided on the left side of the rear surface 14B of the front attachment mounting plate 14. On the other hand, designated at 24 is the right side reflecting member provided on the right side of the rear surface 14B of the front attachment mounting plate 14. These left and right reflecting members 23 and 24 are to prevent a collision accident by reflecting ambient light so that presence and a size of a vehicle can be grasped even in a dark place.

Here, in the left and right reflecting members 23 and 24 according to this embodiment, their mounting positions and shapes are symmetric in the left and right direction. Thus, a mounting structure including a mounting position of the right side reflecting member 24 will be described for the entire configuration (shape), while explanation of the left side reflecting member 23 will be omitted.

Figure 9:
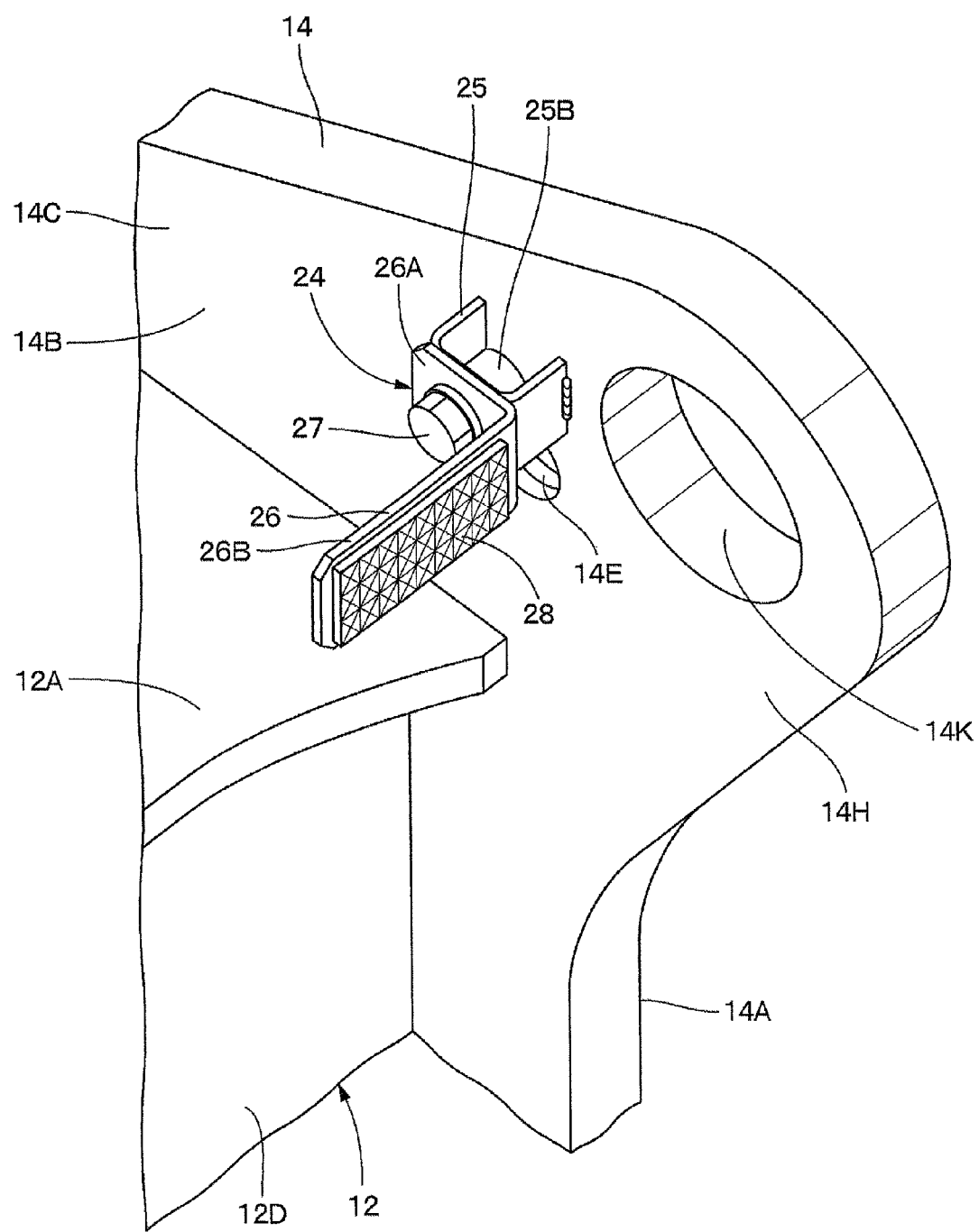
FIG. 9 is an enlarged perspective view of an essential part showing the front attachment mounting plate, the reflecting member and the like from a rear right side.
Figure 11:
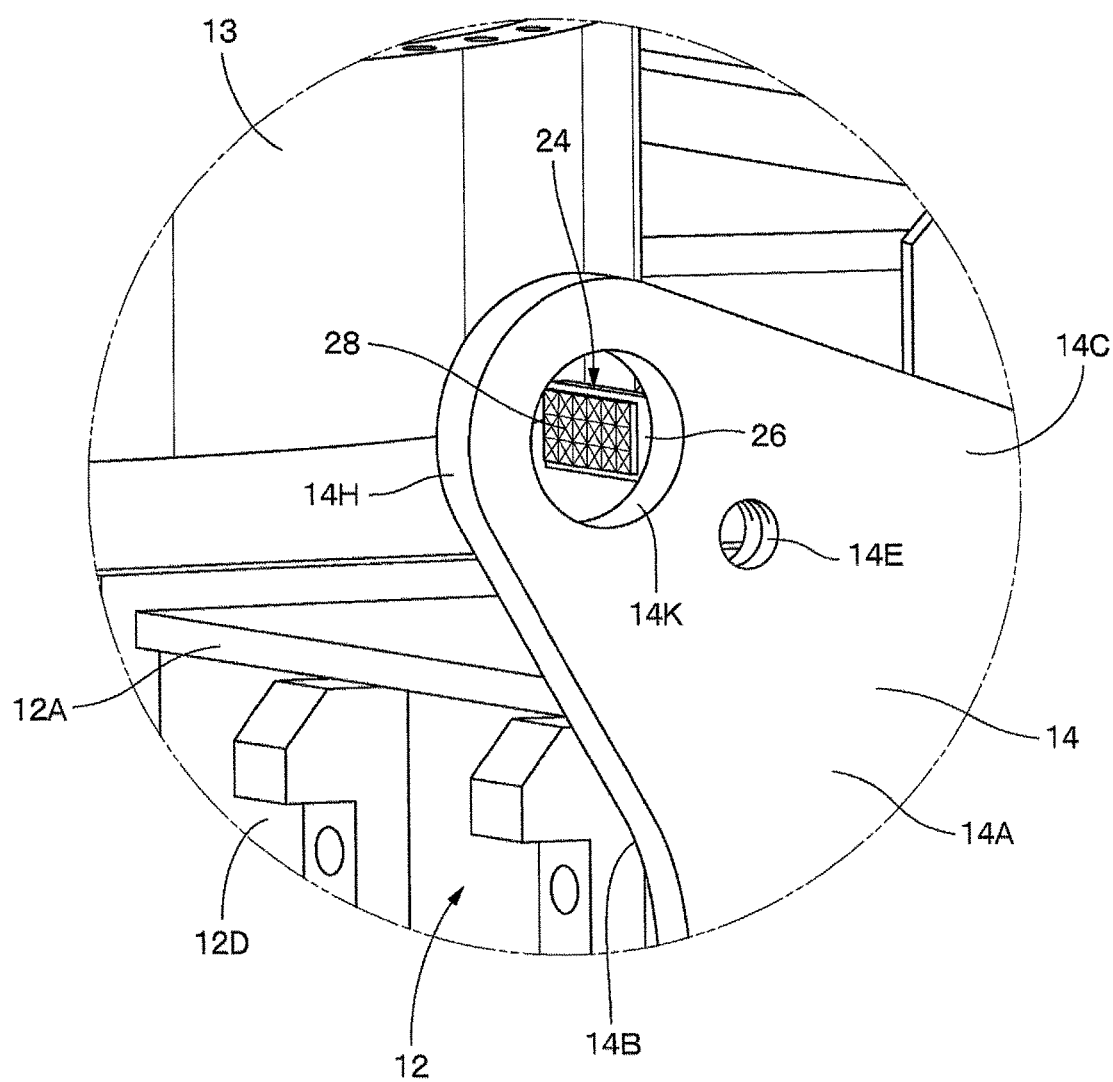
FIG. 11 is an enlarged perspective view of an essential part shown a state in which the reflecting member is visually recognized through a towing through hole of the front attachment mounting plate.

As shown in FIG. 9, the right side reflecting member 24 is provided on the inside (left side) in the left and right direction of the lower traveling structure 2 from the position of the towing through hole 14K, that is, closer to the working mechanism 11 side than the position of the towing through hole 14K and in the vicinity of the towing through hole 14K. Specifically, the reflecting member 24 is juxtaposed adjacent to the towing through hole 14K at a height position substantially equal to a center position of the towing through hole 14K. As a result, as shown in FIG. 11, the reflecting member 24 can be provided at a position that can be visually recognized from the diagonally front right side through the towing through hole 14K. Here, the reflecting member 24 is constituted by a screw seat 25, a mounting bracket 26, and a reflecting body 28 which will be described later.

Figure 10:
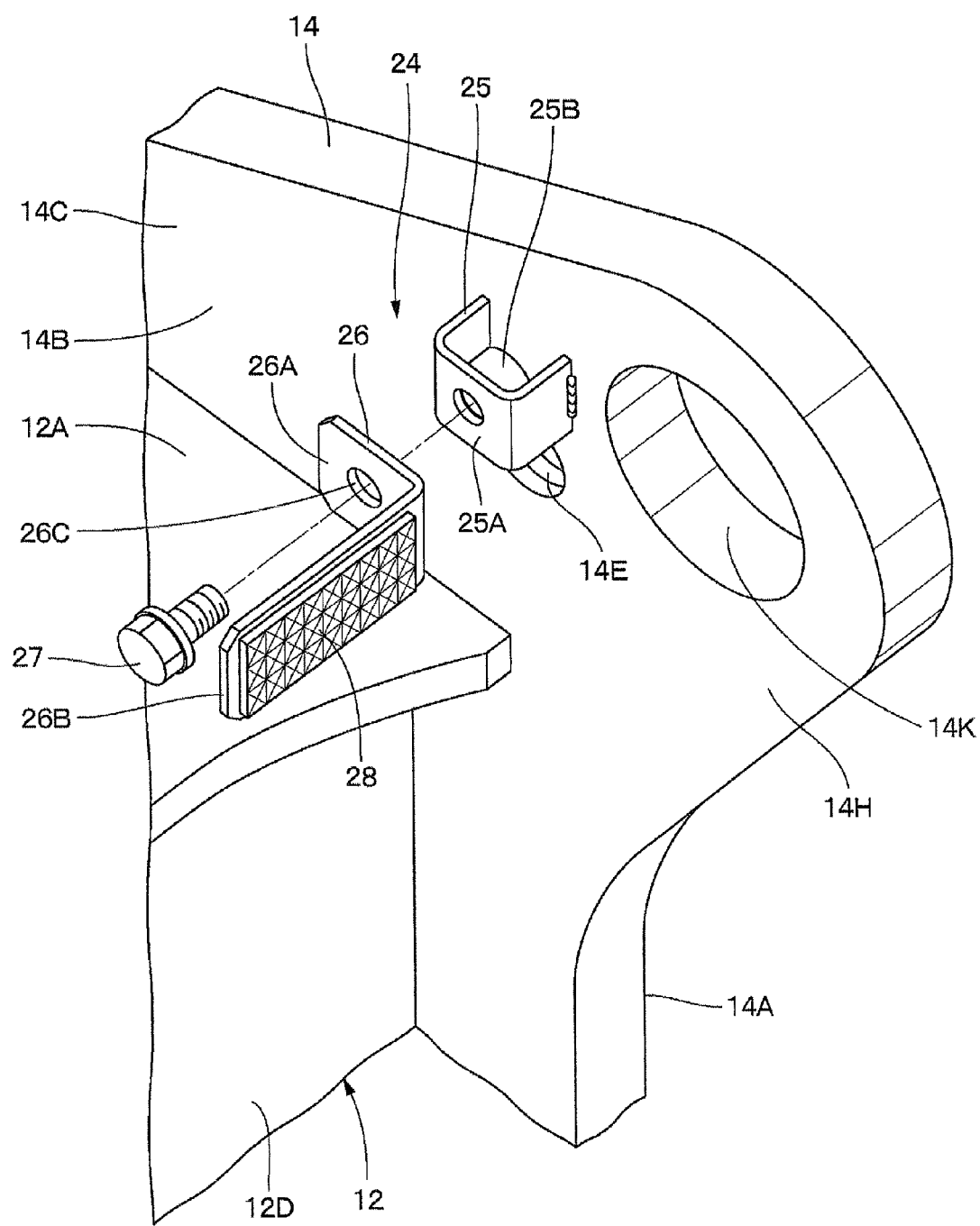
FIG. 10 is an enlarged exploded perspective view of an essential part of a state in which the reflecting member is exploded seen from the position similar to that in FIG. 9.

The screw seat 25 is provided on the rear surface 14B of the front attachment mounting plate 14, and the screw seat 25 is juxtaposed inside the left and right direction (working mechanism 11 side) of the lower traveling structure 2 from the position of the towing through hole 14K and in the vicinity of the towing through hole 14K. As shown in FIG. 10, this screw seat 25 is formed by bending a plate body into a U-shape, and a welding nut 25B which is a female screw hole is welded to a fixing surface 25A at the center. The screw seat 25 is fixed to the rear surface 14B of the front attachment mounting plate 14 by using welding means. Further, the screw seat 25 exemplifies a case provided separately from the front attachment mounting plate 14. Instead of this, it may be configured such that a female screw hole is directly provided in the front attachment mounting plate 14, and a periphery of this female screw hole is used as an integral screw seat.

The mounting bracket 26 is mounted on the screw seat 25. This mounting bracket 26 is constituted, by bending a plate body into an L-shape. That is, the mounting bracket 26 has a short fixing plate 26A faced with the fixing surface 25A of the screw seat 25 and a lengthy mounting surface plate 26B bent at a right angle to a rear side from the fixing plate 26A. A bolt insertion hole 26C is formed in the fixing plate 26A. Regarding the mounting bracket 26, a bolt 27 as a male screw member is inserted into the bolt insertion hole 26C, and this bolt 27 is screwed with the welding nut 25B of the screw seat 25. At this time, the mounting bracket 26 is fixed to the screw seat 25 so that the mounting surface plate 26B is directed to the outside in the left and right direction of the vehicle body. As a result, the mounting bracket 26 can arrange its mounting surface plate 26B so as to extend in the front and rear direction and to be orthogonal to the front attachment mounting plate 14.

The reflecting body (reflector) 28 is mounted on the mounting surface plate 26B of the mounting bracket 26, and this reflecting body 28 is to have presence of an article recognized by reflecting (diffused reflection) light of a head light of a vehicle and a street lamp, for example. The reflecting body 28 is formed having a rectangular shape and is fixed to the mounting surface plate 26B by means of bonding, pasting and the like. In this case, a reflecting surface of the reflecting body 28 is arranged outside the vehicle body, that is, so as to be opposed to a third party located on the side of the vehicle body. As a result, the reflecting body 28 can reflect light emitted mainly from outside the vehicle body toward the vehicle body. Moreover, as shown in FIG. 11, the reflecting body 28 can also reflect light to the front right side through the towing through hole 14K.

Further, as shown in FIG. 1, indicated at 29 is a reflecting member located on the right side of the revolving frame 5 and provided in an intermediate portion in the front and rear direction, and indicated at 30 is a reflecting member provided on a right side surface of the counterweight 7. Moreover, as shown in FIG. 3, indicated at 31 is a reflecting member located on both left and right sides of the counterweight 7 and provided on a lower side of the tail lamp device 10. On the other hand, a reflecting member (none of them is shown) is also provided on the left side of the revolving frame 5 and on the left side of the counterweight 7 at a position similar to the right side, respectively. Thus, by providing a plurality of the reflecting members 23, 24, 29, 30, 31 around the wheel type hydraulic excavator 1, a position and a size of a vehicle body can be recognized even in a dark place.

The wheel type hydraulic excavator 1 according to this embodiment has the above-described configuration. This wheel type hydraulic excavator 1 runs on a public road toward a work site, and after it arrives at the work site, the outrigger device 18 mounted on the chassis 12 of the lower traveling structure 2 is grounded on the ground of the work site and the vehicle body is jacked up.

As a result, the wheel type hydraulic excavator 1 can perform an excavation work of earth and sand by using the working mechanism 11 while revolving the upper revolving structure 4 in a state in which the vehicle body is made stable by using the front and rear outrigger devices 18.

On the other hand, in case the wheel type hydraulic excavator 1 is parked at the work site at night, each of the reflecting members 23, 24, 29, 30, 31 provided around the vehicle body reflect light of the street lamps and other vehicles so that presence and the size of the wheel type hydraulic excavator 1 can be recognized.

Thus, according to this embodiment, it is configured such that on the rear surface 14B of the front attachment mounting plate 14 provided on the front side position of the chassis 12, the reflecting members 23 and 24 reflecting the ambient light is provided by being located inside in the left and right direction of the lower traveling structure 2 forming the vehicle body from the positions of the towing through holes 14J, 14K and in the vicinity of the towing through holes 14J, 14K.

Therefore, by using the front attachment mounting plate 14 provided for mounting the attachment including the outrigger device 18, a flat surface for easy mounting can be ensured on the front surface 14A of the front attachment mounting plate 14. As a result, since it is no longer necessary to prepare a complicated bracket and the like for providing the reflecting members 23, 24, configurations of the reflecting members 23, 24 can be simplified.

Moreover, the reflecting members 23, 24 are juxtaposed in the vicinity of the towing through holes 14J, 14K through which a cable such as a wire and the like is inserted when the wheel type hydraulic excavator 1 is towed. As a result, the reflective light by the reflecting members 23, 24 can be visually recognized through the towing through holes 14J, 14K also from the front surface 14A side of the front attachment mounting plate 14 on the side opposite to the reflecting members 23, 24.

As a result, the reflecting members 23, 24 on the front side which could not been mounted easily can be easily provided at positions adapted for a vehicle body inspection by using the front attachment mounting plate 14. Moreover, since the reflecting members 23, 24 (reflective light) can be visually recognized also from the front side through the towing through holes 14J, 14K, the range in which the reflecting members 23, 24 can be visually recognized can be expanded also to the front side of the front attachment mounting plate 14, and reliability and safety can be improved.

On the other hand, since the reflecting members 23, 24 are arranged inside in the left and right direction of the lower traveling structure 2 from the positions of the towing through holes 14J, 14K, the reflecting members 23, 24 can be arranged at positions a little deeper from, the outer peripheral portion of the chassis 12. As a result, the reflecting members 23, 24 can be protected from collision of a flying stone and the like or adhesion of earth and sand.

The reflecting members 23, 24 do not interfere with movable members including the upper revolving structure 4, the working mechanism 11, the front wheel 16, and the outrigger device 18 by being provided on the front attachment mounting plate 14. As a result, these movable members can be freely designed, and size reduction and improvement of operation performances of the wheel type hydraulic excavator 1 and the like can be realized.

On the other hand, the reflecting members 23, 24 are provided at positions that can be visually recognized from the diagonally front side through the towing through holes 14J, 14K of the front attachment mounting plate 14. As a result, the range in which the reflecting members 23, 24 can be seen can be expanded to the front side by using the existing towing through holes 14J, 14K, whereby visibility and safety can be improved.

The reflecting members 23, 24 are arranged extending in the front and rear direction so as to be orthogonal to the front attachment mounting plate 14. Therefore, the reflecting members 23, 24 can reflect the light emitted from the outside in the left and right direction of the vehicle body, that is, from the side of the wheel type hydraulic excavator 1.

In addition, the screw seat 25 is provided on an inside (working mechanism 11 side) in the left and right direction of the lower traveling structure 2 from the positions of the towing through holes 14J, 14K and on the rear surface 14B of the front attachment mounting plate 14 adjacent to the towing through holes 14J, 14K. By screwing the bolt 27 with the welding nut 25B of this screw seat 25, the mounting bracket 26 can be mounted on the screw seat 25. On this mounting bracket 26, the reflecting body 28 can be mounted so that the reflecting surface reflecting the light is directed to the side of the vehicle body. As a result, the reflecting members 23, 24 reflecting the light emitted mainly from the outside of the vehicle body toward the vehicle body can be assembled. On the other hand, a direction of the reflecting body 28 (mounting bracket 26) can be easily adjusted only by loosening the bolt 27. In addition, in case the reflecting body 28 is damaged, it can be easily replaced.

Moreover, the reflecting body 28 is arranged with its reflecting surface directed toward the outside of the vehicle body. As a result, the reflecting body 28 can reliably reflect the light emitted from outside the vehicle body, whereby reliability and safety can be improved.

Further, in the embodiment, the case in which the outrigger devices 18 as attachment for work are mounted on the both end sides in the front and rear direction of the chassis 12, respectively, is exemplified. However, the present invention is not limited to the same, and a configuration may be provided such that, for example, the outrigger device is mounted on one side in the front and rear direction of the chassis, and other attachments such as an earth removing device used for an earth removing work and the like are mounted instead of the outrigger device on the other side in the front and rear direction of the chassis.

On the other hand, in the embodiment, the case in which the reflecting body 28 of each of the reflecting members 23, 24 is formed having a rectangular shape is exemplified. However, the present invention is not limited to the same, and the reflecting body 28 may have other shapes, for example, including a circle, an oval, a triangle and the like.

Moreover, in the embodiment, the wheel type hydraulic excavator 1 is exemplified as a wheel type working vehicle. However, the present invention is not limited to the same, and can be widely applied to wheel type working vehicles running on a road by front and rear wheels such as a wheel type hydraulic crane and the like, for example.

DESCRIPTION OF REFERENCE NUMERALS

1; Wheel type hydraulic excavator (Wheel type working vehicle)
2: Lower traveling structure (Vehicle body)
4: Upper revolving structure (Vehicle body)
11: Working mechanism
12: Chassis
14: Front attachment mounting plate
14A, 15E: Front surface
14B, 15A: Rear surface
14J, 14K, 15J, 15K: Towing through hole
15: Rear attachment mounting plate
16: Front wheel
17; Rear wheel
18: Outrigger device (Attachment)
21; Mounting end plate
23, 24: Reflecting member
25: Screw seat
53; Welding nut (Female screw hole)
26: Mounting bracket
27: Bolt (Male screw member)
28: Reflecting body

The invention claimed is:

1. A wheel type working vehicle, comprising:
a lower traveling structure (2) having a chassis (12) extending in a front and rear direction and left and right front wheels (16) and left and right rear wheels (17) provided on said chassis (12) so as to constitute a lower vehicle body,
an upper revolving structure (4) rotatably mounted on said chassis (12) of said lower traveling structure (2) and constituting an upper vehicle body, and
a working mechanism (11) provided on a front side of said upper revolving structure (4) and at an intermediate position in a left and right direction, comprising:
an attachment mounting plate (14) made of a plate body extending in the left and right direction and a vertical direction is provided on a front side position of said chassis (12) and on which an attachment (18) is mounted on a front surface (14A) of said attachment mounting plate;
a towing through hole (14J, 14K) bored through said attachment mounting plate at an upper side position on both left and right sides and in the front and rear direction and used for mounting a cable in towing;
a reflecting member (23, 24) located inside in the left and right direction of said vehicle body from the position of said towing through hole (14J, 14K) and in the vicinity of said towing through hole (14J, 14K) for reflecting ambient light is provided on a rear surface (14B) of said attachment mounting plate (14),
said reflecting member (23, 24) is provided at a position that can be visually recognized from a diagonally front side through said towing through hole (14J, 14K).

2. The wheel type working vehicle according to claim 1, wherein
said reflecting member (23, 24) is arranged by extending in the front and rear direction so as to be orthogonal to said attachment mounting plate (14).

3. The wheel type working vehicle according to claim 1, wherein
said reflecting member (23, 24) is constituted by a screw seat (25) having a female screw hole (25B) provided inside in the left and right direction of said vehicle body from the position of said towing through hole (14J, 14K) and located in the vicinity of said towing through hole (14J, 14K) and on a rear surface (14B) of said attachment mounting plate (14), a mounting bracket (26) mounted on said screw seat (25) by a male screw member (27) screwed with said female screw hole (25B), and a reflecting body (28) mounted on said mounting bracket (26) so as to reflect light emitted toward said vehicle body mainly from outside said vehicle body.

4. The wheel type working vehicle according to claim 3, wherein
said reflecting body (28) of said reflecting member (23, 24) is arranged with a reflecting surface thereof directed to the outside of said vehicle body.

* * * * *